United States Patent
Limaye et al.

(10) Patent No.: US 7,694,916 B2
(45) Date of Patent: Apr. 13, 2010

(54) CATALYTIC REACTIVE COMPONENT REDUCTION SYSTEM AND METHODS FOR THE USE THEREOF

(75) Inventors: Santosh Limaye, El Cajon, CA (US); Donald Koenig, San Diego, CA (US)

(73) Assignee: Phyre Technologies Inc., El Cajon, CA (US)

( * ) Notice: Subject to any disclaimer, the term of this patent is extended or adjusted under 35 U.S.C. 154(b) by 30 days.

(21) Appl. No.: 11/994,801

(22) PCT Filed: Jul. 6, 2006

(86) PCT No.: PCT/US2006/026631

§ 371 (c)(1), (2), (4) Date: Feb. 26, 2008

(87) PCT Pub. No.: WO2007/008730

PCT Pub. Date: Jan. 18, 2007

(65) Prior Publication Data

US 2008/0199376 A1    Aug. 21, 2008

Related U.S. Application Data

(63) Continuation of application No. PCT/US2006/026631, filed on Jul. 6, 2006.

(60) Provisional application No. 60/697,636, filed on Jul. 8, 2005, provisional application No. 60/742,470, filed on Dec. 5, 2005.

(51) Int. Cl.
*B01J 7/00* (2006.01)
*B01J 19/14* (2006.01)
*B64D 37/32* (2006.01)

(52) U.S. Cl. ............... 244/135 R; 423/219; 423/245.1; 423/245.3; 422/204; 204/157.3

(58) Field of Classification Search ............. 244/135; 423/219; *B64D 37/32*
See application file for complete search history.

(56) References Cited

U.S. PATENT DOCUMENTS 3,847,298 A * 11/1974 Hamilton ............ 220/88.3
5,207,734 A    5/1993 Day et al.
6,463,889 B2  10/2002 Reddy

OTHER PUBLICATIONS

International Search Report for PCT Application No. PCT/US2006/026631.
Notification of First Office Action for China Patent Application No. 200680028199.2.

* cited by examiner

*Primary Examiner*—Jerry Lorengo
*Assistant Examiner*—Jared Wood
(74) *Attorney, Agent, or Firm*—Foley & Lardner LLP; Stephen E. Reiter

(57) ABSTRACT

In accordance with the present invention, there are provided simplified systems and methods for catalytically deactivating, removing, or reducing the levels of reactive component(s) from the vapor phase of fuel storage tanks. The simple apparatus described herein can be utilized to replace complex OBIGGS systems on the market. Simply stated, in one embodiment of the invention, the vapor phase from the fuel tank is passed over a catalytic bed operated at appropriate temperatures to allow the reaction between free oxygen and the fuel vapor by oxidation of the fuel vapor, thus deactivating reactive component(s) in the gas phase.

37 Claims, 18 Drawing Sheets

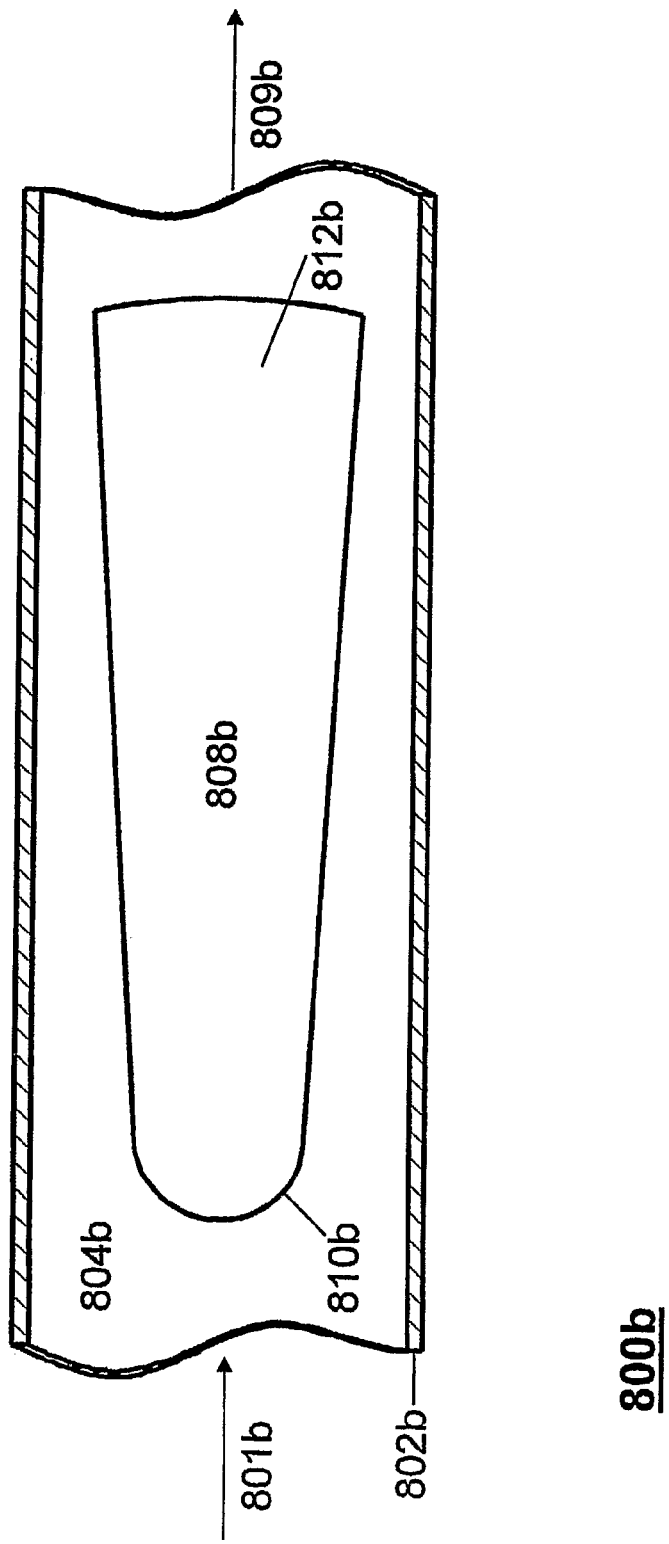

US 7,694,916 B2

CATALYTIC REACTIVE COMPONENT REDUCTION SYSTEM AND METHODS FOR THE USE THEREOF

FIELD OF THE INVENTION

The present invention relates to the field of on board reactive component removal systems, and reaction systems and methods for the removal of reactive components from the vapor phase of fuel storage vessels. In a particular aspect, the invention relates to systems and methods for the catalytic removal of reactive components from the vapor phase of fuel storage vessels, specifically oxygen and/or fuel, thereby reducing the potential for fire and explosion in such vessels.

BACKGROUND OF THE INVENTION

In order to avoid the potential fire and explosion hazard in fuel tanks (e.g., aircraft fuel tanks, ships carrying flammable fluids as cargo, and the like), it is necessary to reduce the concentration of reactive components (e.g., oxygen and/or fuel vapors) in the gas phase that is in contact with liquid fuel. Many different approaches have been taken in efforts to address this problem. One such approach, for example, involves taking the bleed air from an aircraft engine, passing it through a membrane based gas separator to remove a sufficient amount of the oxygen so as to reduce the oxygen concentration below 10%. This reduced oxygen content gas is then used as an inert gas blanket in the fuel tank.

Another method employed in the art involves use of a pressure swing adsorption system to separate the oxygen from air to generate oxygen depleted inert gas.

These, as well as other systems described in the prior art require elaborate setup and add significantly to the cost of operation based on the provision of an on board inert gas generator system (OBIGGS). Accordingly, there is a need for improved systems and methods for removing reactive components (e.g., oxygen and/or fuel vapors), or reducing the levels thereof, from the vapor phase of fuel storage vessels.

SUMMARY OF THE INVENTION

In accordance with the present invention, there are provided simplified systems and methods for catalytically reducing the concentration of one or more reactive component(s) in the vapor phase of fuel storage tanks. The simple apparatus described herein can be utilized to replace complex OBIGGS systems on the market. Simply stated, in one embodiment of the invention, the vapor phase from the fuel tank is passed over a catalytic bed operated at appropriate temperatures to allow the reaction between free oxygen and the fuel vapor by oxidation of the fuel vapor, thus deactivating reactive components in the gas phase. In addition, circulation and treatment of vapors as contemplated herein minimizes the venting of fuel-containing vapors to the atmosphere.

In another embodiment of the present invention, there are provided systems for deactivating, reducing the concentration of, or removing one or more reactive components (e.g., oxygen and/or fuel vapors) from the vapor phase of a fuel storage tank. Invention systems include a reaction zone having an inlet and outlet, wherein the reaction zone provides conditions suitable to deactivate the reactive components. Optionally, inventive systems include the ability to remove heat and or water from the vapor phase.

In yet another embodiment of the present invention, there are provided fuel storage systems for use in a vessel (e.g., an aircraft, a ship carrying flammable fluids as cargo, and the like), such fuel storage systems being capable of maintaining the concentration levels of one or more reactive components in the vapor phase of the fuel storage tank at sufficiently low levels so as to dramatically reduce the risk of fire and explosion therefrom. Moreover, circulation and treatment of vapors as contemplated herein minimizes the venting of fuel-containing vapors to the atmosphere.

In still another embodiment of the present invention, there are provided methods for deactivating, reducing the concentration of, or removing one or more reactive components from the vapor phase of a fuel storage tank. Invention methods comprise passing at least a portion of the vapor phase from the fuel storage tank through a reaction zone which serves to deactivate the reactive components before the vapor phase is returned to the fuel storage tank. Optionally, inventive methods include the ability to remove heat and/or water from the vapor phase.

BRIEF DESCRIPTION OF THE FIGURES

FIG. 10 collectively illustrates three embodiments of a catalyst tube contemplated for use in the practice of the present invention. FIG. 10B is a view of an embodiment of a catalyst tube having an internal cone which may be coated with catalyst.

DETAILED DESCRIPTION OF THE PREFERRED EMBODIMENTS

Figure 1:
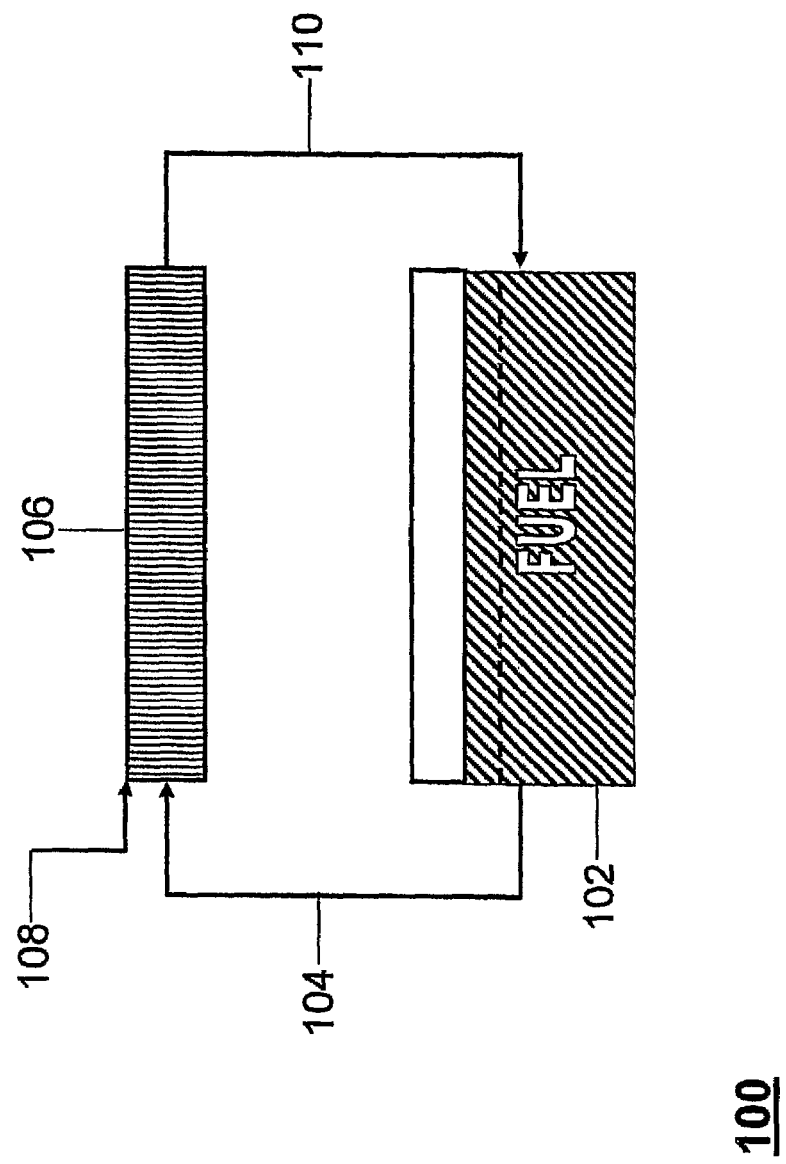
FIG. 1 is a schematic illustration of one embodiment of a reactive component reduction system according to the invention.

In accordance with the present invention, there are provided systems for reducing the concentration of one or more reactive component(s) from the vapor phase of a fuel storage tank (e.g., by deactivation of the reactive component(s) therein), wherein said fuel storage tank is provided with an outlet for removal of vapor therefrom and an inlet for return of vapor thereto. Invention systems comprise:

- a reaction zone, wherein said reaction zone provides conditions suitable to deactivate said one or more reactive component(s) when contacted therewith,
- an inlet to said reaction zone in fluid communication with the vapor space of said fuel storage tank via the outlet of the fuel storage tank, and
- an outlet from said reaction zone in fluid communication with the vapor space of said fuel storage tank via the inlet of the fuel storage tank.

As readily recognized by those of skill in the art, there are a variety of reactive components which one may desirably wish to remove (or reduce the concentration of) when in contact with fuel (such as jet fuel). One reactive component contemplated for treatment in accordance with the present invention is oxygen. Another reactive component contemplated for treatment in accordance with the present invention may also include fuel vapor, as well as a variety of additives and/or impurities commonly associated therewith. A particular advantage of the present invention relates to the fact that circulation and treatment of vapors as contemplated herein minimizes the venting of fuel-containing vapors to the atmosphere, thereby reducing the environmental impact caused by the handling of such materials.

Invention systems optionally comprise an inlet/outlet which enables equilibration of pressure within the vessel depending on whether the vessel is exposed to sub- or super-atmospheric conditions. For example, it may be desirable to provide a source of make-up gas to equilibrate pressure within the system upon exposure to sub-atmospheric conditions. Alternatively, upon exposure to super-atmospheric conditions, it may be desirable to allow venting of the vessel to reduce the pressure therein. For example, upon ascent or descent of an aircraft, pressures within the aircraft, including fuel storage vessels therein, may vary significantly. In the case of descent, for example, it may be desirable to supplement the gas content of the vessel. Conversely, upon ascent of an aircraft, it may be desirable to relieve excess pressure on the fuel storage vessel. Optionally, make-up gas (or vented vapors) will be subjected to the invention method for deactivating one or more reactive component(s) therein (e.g., by reducing the concentration thereof) so as to reduce the safety hazards associated with the introduction of outside air into the system, or the venting of vapors to the atmosphere.

Invention systems may optionally be configured as closed loop systems. As employed herein, the term "closed loop" refers to the fact that the vapor having been treated to deactivate the reactive components therein is returned to the fuel storage vessel, rather than being vented. It is to be understood, however, that invention closed loop systems still contemplate the presence of one or more inlets/outlets for such purposes as equilibration of pressure therein, removal of water vapor or other components therefrom, and the like. The reaction zone contemplated for use in the practice of the present invention can be configured in a variety of ways, e.g., the reaction zone may comprise a vessel containing catalyst, wherein said catalyst is reactive with said one or more reactive component(s) when contacted therewith under suitable conditions. In some embodiments, the vessel has an inlet end and an outlet end, and catalyst content can vary throughout the vessel. In certain other embodiments the catalyst content can increase from the inlet end to the outlet end of the vessel.

As employed herein, "deactivate" refers to the conversion of reactive components such as oxygen, fuel vapor, and the like, into substantially non-reactive species, i.e., species that are substantially inert under the conditions to which they are exposed. Preferably, deactivated species are non-flammable.

Catalysts contemplated for use in the practice of the present invention include optionally supported metal catalysts, such as, for example, noble metals (e.g., platinum, palladium, gold, silver, and the like), precious metals, transition metals, metal oxides, rare earth oxides, nitrides, carbides, enzymes, and the like, as well as mixtures of any two or more thereof. "Catalytic" refers to facilitating a reaction or interaction involving one or more reactants. Catalytic materials may include noble metals, transition metals, metal oxides (e.g., transition metal oxides such as RuOx, LaMnOx and peravskites), and the like, as well as various combinations thereof.

Catalytic materials contemplated for use herein may optionally be supported on a variety of materials, such as for example, metallic supports, activated carbon, carbon black, and the like, as well as mixtures thereof. Inorganic oxides may also be employed as support materials, either alone or in combination, e.g., silica, alumina, silica-alumina, magnesia, titania, zirconia, montmorillonite, and the like, or combinations thereof, for example, silica-chromium, silica-titania, and the like.

When catalytic treatment of reactive components is employed, a wide variety of suitable conditions for contacting said catalyst with said one or more reactive component(s) are contemplated. Exemplary conditions comprise contacting the vapor phase materials with catalyst at a temperature in the range of about 25° C. up to about 1200° C. Presently preferred temperatures contemplated for use herein range from about 50° C. up to about 400° C. Even more preferred are temperatures ranging from about 100° C. up to about 350° C.

To facilitate control of the above-described catalytic process, the invention system can optionally further comprise a temperature modulator. Optionally, the temperature modulator can be a heat exchanger, which may include a heat exchange medium. The heat exchange medium can optionally include a liquid or external air. Optionally, heat exchange can be accomplished by evaporative cooling. The heat exchanger can be positioned in a variety of locations within the invention system, e.g. the heat exchanger can be associated with the catalyst containing vessel; or the heat exchanger can be positioned upstream or downstream from the catalyst containing vessel; or the heat exchanger may be integrated with the catalyst vessel.

When the temperature modulator is positioned upstream of the catalyst containing vessel, it is preferably used to pre-heat either the fuel vapor, air, or a mixture thereof. When the temperature modulator is positioned downstream of the catalyst containing vessel, it is preferably used to reduce the temperature of the vapor exiting the catalyst containing vessel. When the temperature modulator is associated with the catalyst containing vessel, it can be used to heat or cool the reaction vessel, as necessary, to provide conditions suitable for catalyzing reaction of oxygen with fuel vapor, thereby deactivating reactive components (e.g., oxygen and/or fuel vapor) in the fuel vapor and air mixture.

Alternative methods for treating reactive components in accordance with the present invention include employing a reaction zone which comprises a source of microwave energy sufficient to deactivate said one or more reactive component(s) when contacted therewith.

As yet another alternative method for treating reactive components in accordance with the present invention, a reaction zone can be employed which comprises a source of plasma energy sufficient to deactivate said one or more reactive component(s) when contacted therewith.

Optionally, invention systems may further comprise a flame arrestor between the fuel storage tank and the reaction zone so as to prevent any possibility of combustion to communicate back to the fuel storage tank. Alternatively, the reaction zone can be designed so as to prevent any flame formation.

Additional optional features which may be included in invention systems include one or more oxygen sensors, which may be positioned upstream and/or downstream from the reaction zone so as to monitor the oxygen levels in the inlet and/or outlet gas of the fuel storage tank. Additionally, a feedback loop could be provided so as to adjust the contacting conditions within the reaction zone as a function of the oxygen levels detected before and/or after the reaction zone.

As used herein, the term "upstream" refers to an element in a flow scheme which is located prior to or before a reference point or reference element. As used herein, the term "downstream" refers to an element in a flow scheme which is located after a reference point or reference element.

In certain embodiments of the invention, the system may also include a fluid purification module adapted to remove water from the treated air. For example, the fluid purification module may include a condenser to reduce the temperature of the treated vapor below the dew point, thereby facilitating removal of any excess water. In a particular embodiment, the fluid purification module may include a pressure swing adsorption module. In other embodiments, the purification module may include membranes. A recirculation line may be provided to transfer the fluid from the fluid purification module to the inlet to the reaction zone. The fluid purification module may be located upstream or downstream from the reaction zone. In other embodiments, water may be removed by a moisture trap.

As used herein, "purification" and "purifying" refer to the removal from a fluid of one or more components. The removal may be partial, complete or to a desired level and may include removal of only some or all components.

In one embodiment, the system may also include a recirculation line adapted to transfer the fluid from the separator to the inlet of the reaction zone.

In one embodiment, the system may also include a vapor trap adapted to separate vaporized liquid mixed with the fluid from the separator.

In accordance with a further aspect of the present invention, there are provided systems for introducing reactive component-depleted vapor into a fuel storage vessel as fuel is withdrawn therefrom. Invention systems comprise:

a reaction zone having an inlet and outlet, a source of air, wherein the source of air is in fluid communication with the inlet of the reaction zone, a source of fuel vapor, wherein the source of fuel vapor is in fluid communication with the inlet of said reaction zone, and optionally a filter/condenser, wherein when the filter/condenser is present, the reaction zone is in fluid communication with the inlet of the filter/condenser, and the outlet of the filter/condenser is in fluid communication with the fuel storage vessel, wherein said reaction zone operates under conditions suitable to remove or reduce the concentration of oxygen in the source of air when contacted therewith in the presence of fuel vapor, and is in fluid communication with the fuel storage vessel.

In accordance with a still further aspect of the present invention, there are provided systems for displacing fuel in, or vapor in the vapor space of, a fuel storage vessel with reactive component-depleted vapor (e.g., as fuel or fuel vapor from the vapor space thereof is withdrawn therefrom). Invention systems comprise:

a reaction zone having an inlet and outlet, a source of air, wherein the source of air is in fluid communication with the inlet of the reaction zone, a source of fuel vapor, wherein the source of fuel vapor is in fluid communication with the inlet of said reaction zone, and optionally a filter/condenser, wherein when the filter/condenser is present, the reaction zone is in fluid communication with the inlet of the filter/condenser, and the outlet of the filter/condenser is in fluid communication with the fuel storage vessel, wherein said reaction zone provides conditions suitable to remove or reduce the concentration of oxygen in the source of air when contacted therewith in the presence of fuel vapor, wherein the reaction zone is in fluid communication with the fuel storage vessel.

In accordance with yet another aspect of the present invention, there are provided fuel storage systems for use in aircraft. Invention fuel storage systems comprise:

a fuel storage tank having an outlet for removal of vapor therefrom, and an inlet for return of vapor thereto, and a reaction zone having an inlet and outlet, wherein said reaction zone provides conditions suitable to deactivate one or more reactive component(s) in the vapor phase of said fuel storage tank when contacted therewith, wherein the outlet of said fuel storage tank is in fluid communication with the inlet of the reaction zone, and the inlet of said fuel storage tank is in fluid communication with the outlet of said reaction zone.

In accordance with still another aspect of the present invention, there are provided systems for reducing the concentration of one or more reactive components from the vapor phase of a fuel storage tank (e.g., by deactivation of the reactive component(s) therein), wherein said fuel storage tank comprises an outlet for removal of vapor therefrom and an inlet for return of vapor thereto. Invention systems comprise, a catalyst zone, said catalyst zone comprising an optionally supported metal catalyst, said catalyst being capable of promoting reaction of one or more reactive component(s) when contacted therewith under suitable conditions, an inlet to said system in fluid communication with the vapor space of said fuel storage tank via the outlet of the fuel storage tank, and an outlet from said reaction zone in fluid communication with the vapor space of said fuel storage tank via the inlet of the fuel storage tank.

Embodiments of the invention can include a temperature modulator associated with the catalyst zone. In other embodiments, invention systems can include a trap for removing water from the vapor.

In accordance with still another aspect of the present invention, there are provided fuel storage systems for use in aircraft. Invention systems comprise:

a fuel storage tank having an outlet for removal of vapor therefrom, and an inlet for return of vapor thereto, and a reaction zone having an inlet and outlet, wherein said reaction zone provides conditions suitable to deactivate one or more reactive component(s) in the vapor phase of said fuel storage tank when contacted therewith, wherein the outlet of said fuel storage tank is in fluid communication with the inlet of the reaction zone, and the inlet of said fuel storage tank is in fluid communication with the outlet of said reaction zone.

In accordance with still another aspect of the present invention, there are provided methods for reducing the concentration of one or more reactive component(s) from the vapor phase of a fuel storage tank (e.g., by deactivation of the reactive component(s) therein), wherein said fuel storage tank is provided with outlet for removal of vapor therefrom and inlet for return of vapor thereto. Invention methods comprise:

passing at least a portion of the vapor phase from the fuel storage tank through a reaction zone, wherein said reaction zone provides conditions suitable to deactivate said one or more reactive component(s) when contacted therewith, thereby producing a vapor phase having reduced concentration of reactive component(s) therein, and thereafter returning the vapor phase having reduced concentration of reactive component(s) therein to said fuel storage tank.

In accordance with yet another aspect of the present invention, there are provided methods for displacing fuel in, or vapors in the vapor space of, a fuel storage vessel with reactive component-depleted vapor (e.g., as fuel or fuel vapor from the vapor space thereof is withdrawn therefrom). Invention methods comprise:

combining air with vaporized fuel, passing the resulting combination through a reaction zone under conditions suitable to produce reactive component-depleted vapor, optionally removing any water from the reactive component-depleted vapor to produce substantially water-free, reactive component-depleted vapor, and introducing the resulting substantially water-free, reactive component-depleted vapor into said fuel storage vessel.

Additional methods contemplated herein for displacing fuel in, or vapors in the vapor space of, a fuel storage vessel with reactive component-depleted vapor (e.g., as fuel or fuel vapor from the vapor space thereof is withdrawn therefrom) comprise:

contacting a combination of air and vaporized fuel in a reaction zone under conditions suitable to produce reactive component-depleted air, optionally removing any water from the reactive component-depleted air to produce substantially water-free, reactive component-depleted air, introducing the resulting substantially water-free, reactive component-depleted air into said fuel storage vessel.

Additional methods contemplated herein for displacing fuel in, or vapors in the vapor space of, a fuel storage vessel with reactive component-depleted vapor comprise introducing treated vapor into said fuel storage vessel as fuel or fuel vapor from the vapor space thereof is withdrawn therefrom, wherein said treated vapor is prepared by passing a combination of air and vaporized fuel through a reaction zone under conditions suitable to produce reactive component-depleted air, and optionally removing any water from the reactive component-depleted air.

FIG. 1 is a schematic illustration of one embodiment of the present invention. Reactive component reduction system 100 is supplied with a mixture of air (containing nitrogen and oxygen) and fuel vapor from fuel vessel 102. The air/fuel vapor mixture is supplied via line 104 to catalyst bed 106 which is maintained at conditions sufficient to reduce the oxygen content of the air and fuel vapor mixture. Optionally, air may be supplied to (or removed from) catalyst bed 106 (as needed) via line 108 to allow for equalization of the pressure in the fuel vessel. The air and fuel vapor mixture can then be supplied from catalyst bed 106 via line 110 to fuel vessel 102.

Figure 2:
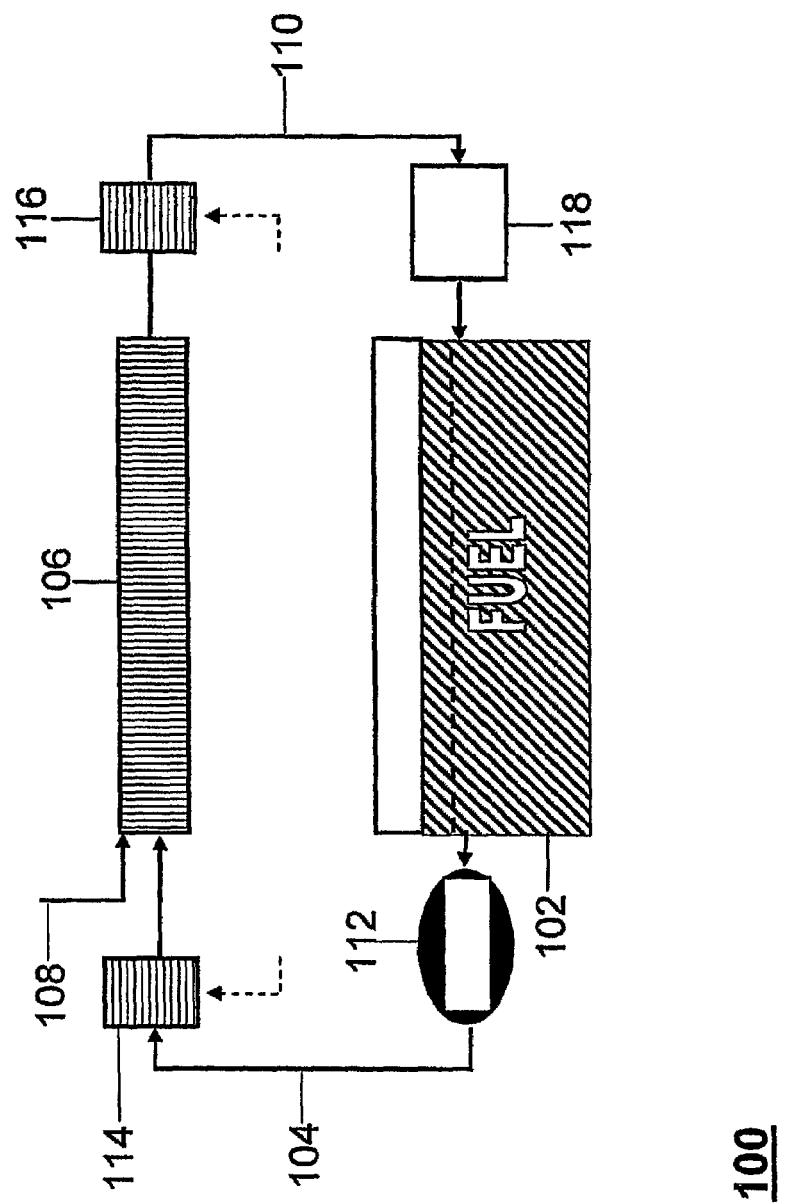
FIG. 2 is a schematic illustration of another embodiment of a reactive component reduction system according to the invention.

FIG. 2 is a schematic illustration of another embodiment of the invention reactive component reduction system shown in FIG. 1. Pump 112 is provided to facilitate supplying the air and fuel vapor mixture from fuel vessel 102 to catalyst bed 106. Optional porous plug flame arrestors 114 and 116 can be provided upstream and downstream of catalyst bed 106, respectively, to prevent flames or sparks from the catalyst bed from spreading or contacting fuel vessel 102. Water filter 118 can be provided downstream from catalyst bed 106 and flame arrestor 116 can be provided to remove water present in the air and fuel vapor mixture of reduced reactive component content before the mixture is recirculated to fuel vessel 102.

Figure 3:
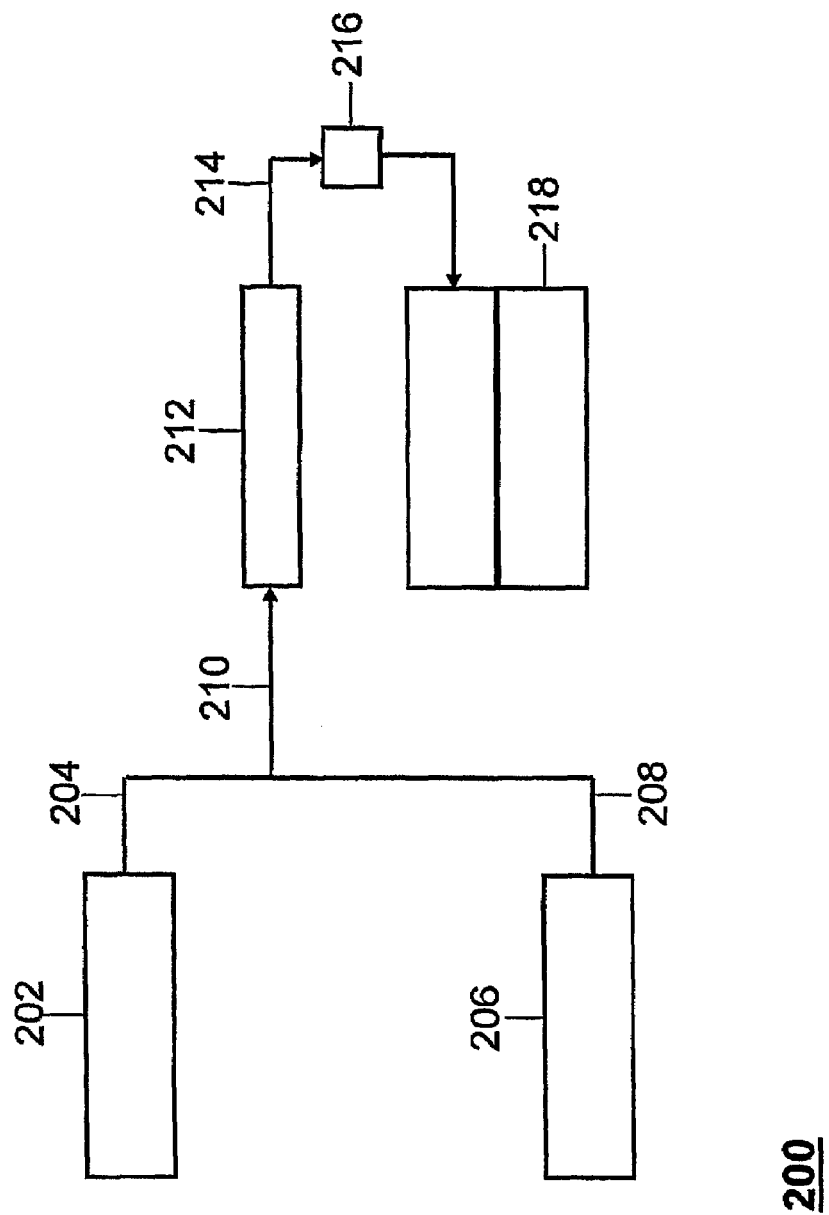
FIG. 3 is a schematic illustration of yet another embodiment of a reactive component reduction system according to the invention.

FIG. 3 is a schematic representation of another embodiment of the present invention, wherein source of air 202 and source of fuel vapor 206 are supplied to line 210 via lines 204 and 208, respectively, where they are combined to form a fuel vapor/air mixture and supplied to catalyst bed 212. Alternatively, the air 202 and fuel vapor 206 can be supplied directly to catalyst bed 212 where they are combined. The fuel vapor/air mixture is subjected to the action of a catalyst such that the catalyst reduces the reactive component content of the fuel vapor/air mixture. Any of a number of different catalysts can be employed in the practice of the present invention, e.g., a presently preferred catalyst employed is a standard noble metal catalyst. The fuel vapor/air mixture, having a reduced reactive component content, exits catalyst bed 212 via line 214, may optionally be passed through filter/condenser 216 to remove any water formed during the catalytic treatment, and thereafter introduced into fuel storage vessel 218 as fuel is withdrawn therefrom.

Figure 4:
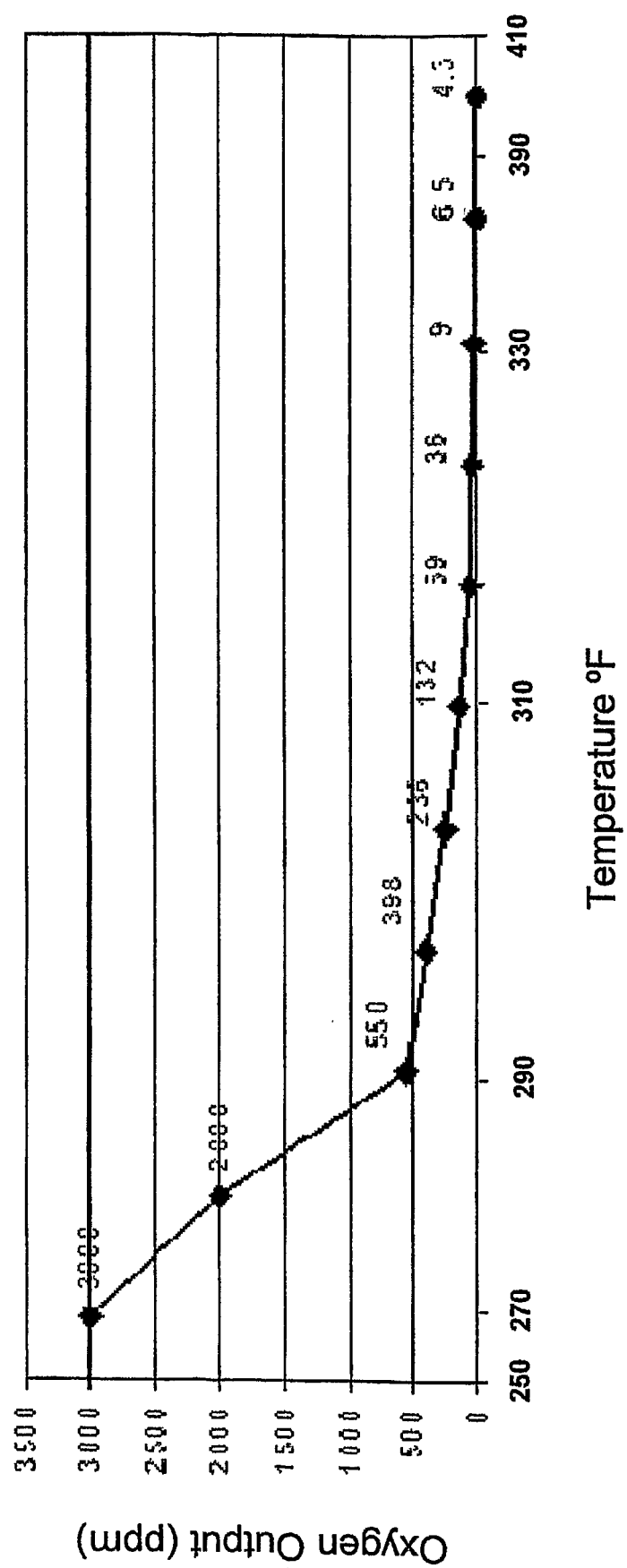
FIG. 4 illustrates the performance of an inventive catalytic reactive component removal system. At relatively low temperatures, a standard noble metal catalyst is capable of reducing the oxygen level from a starting level of 0.6% to less than 5 ppm.

FIG. 4 shows the performance of a catalyst under low oxygen concentration. A mixture of air and fuel vapor was passed over pellets of a standard noble metal catalyst packed in a ½ inch by 7 inch stainless steel tube at varying temperatures, and the oxygen content of the effluent gases therefrom was determined. The graph shows the concentration of oxygen in the catalyst tube effluent as a function of increasing temperature. As shown in FIG. 4, oxygen content in the catalyst tube effluent declines rapidly as the temperature is increased to approximately 290° F. (143° C.), wherein an oxygen content of approximately 650 ppm was measured. As temperature is further increased from 290° F. (143° C.) to 400° F. (204° C.), the oxygen content in the effluent gradually decreases to less than 5 ppm. This example clearly demonstrates the ability of operating such a reactive component reduction system.

Figure 5:
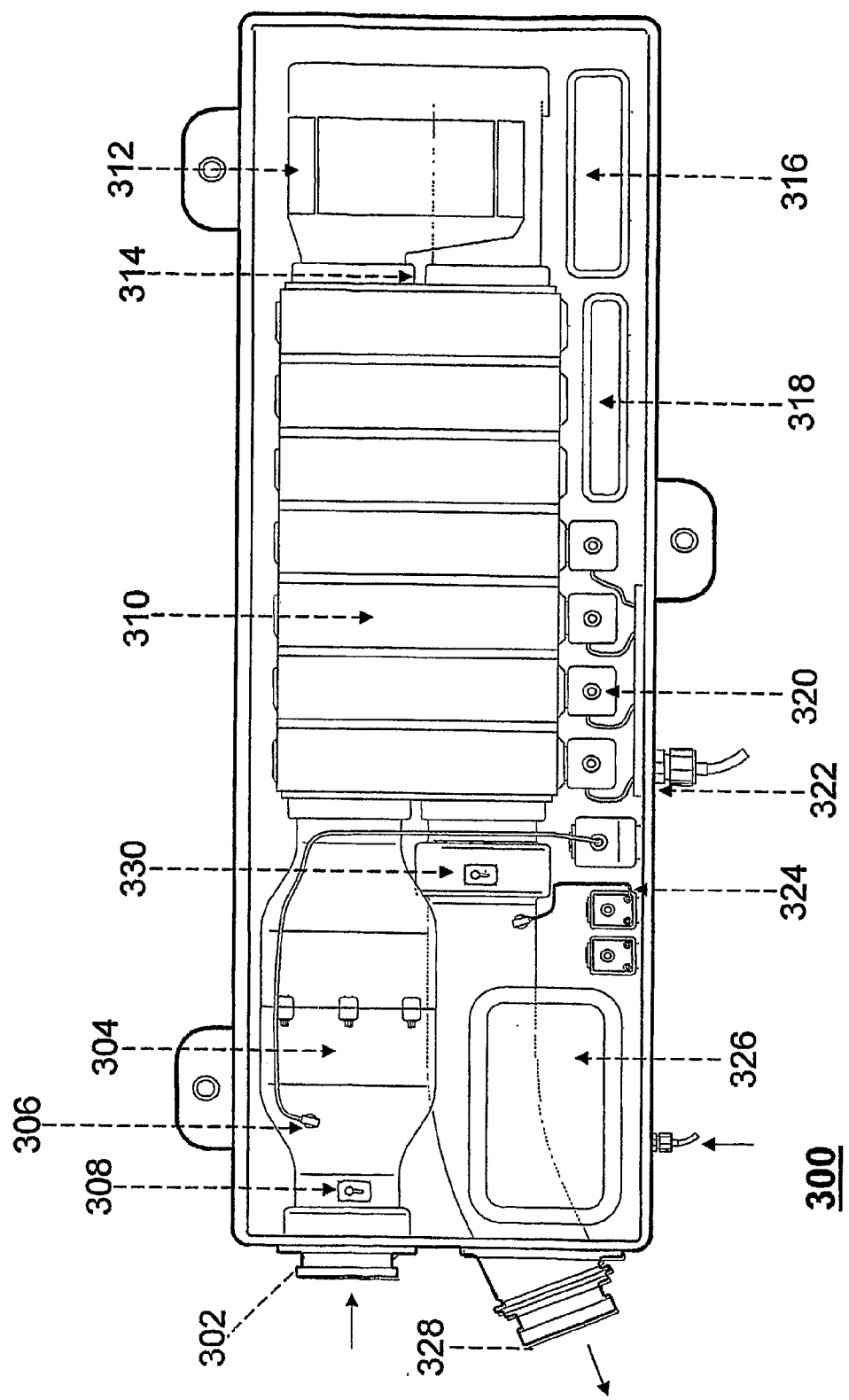
FIG. 5 is a schematic illustration of another embodiment of a reactive component reduction system according to the invention.

FIG. 5 shows one embodiment of an invention reactive component removal system which includes a temperature modulator and a catalyst zone. Reactive component removal system 300 is supplied with vapor from a fuel tank (which may include oxygen dissolved therein) via inlet 302. Inlet 302 can include blower 304, which may facilitate the movement of the vapor through reactive component removal system 300. Inlet 302 may also include sample port 306 for sampling the content of the inlet gas, and may also include reverse flow valve 308. Vapor entering the system via inlet 302 is supplied to temperature modulator 310, which may include, for example, a shell and tube design heat exchanger. The heat exchange medium can be external air or gas, or can be a liquid. Optionally, purified vapor from the reactive component removal system may be used as the heat exchange medium. The system may also include heater 312 upstream from catalyst bed 314. Catalyst bed 314 may be configured in a variety of ways, e.g. a fluidized bed, or may include catalyst supported on fins or cones.

Temperature modulator 310, which may be a heat exchanger, may also include means for removal or water from a vapor stream, and may include water drain 322 and automatic moisture drain valves 320. Vapor of reduced reactive component content exits the system via outlet 328, which can include oxygen sensor 324 and reverse flow valve 330.

Reactive component removal system 300 may be sized appropriately based upon the volume of vapor to be treated and the desired rate of removal of reactive component from the vapor. Similarly, heat exchanger 310 may vary in size based on a variety of parameters, including the heat exchange medium employed and the temperature gradient.

In one example of the invention reactive component removal system, a unit designed to have a flow rate of at least 50 CFM (cu. ft./min.) is provided. Preferably, the system provides a flow rate of at least 150 CFM (cu. ft./min.). In one example of the invention reactive component removal system, the dimensions of the unit are approximately 12 in.×12 in.×40 in. In one such system, the catalyst bed can be a round tube at least 5 in. diameter and 4.5 in. in length.

Figure 6:
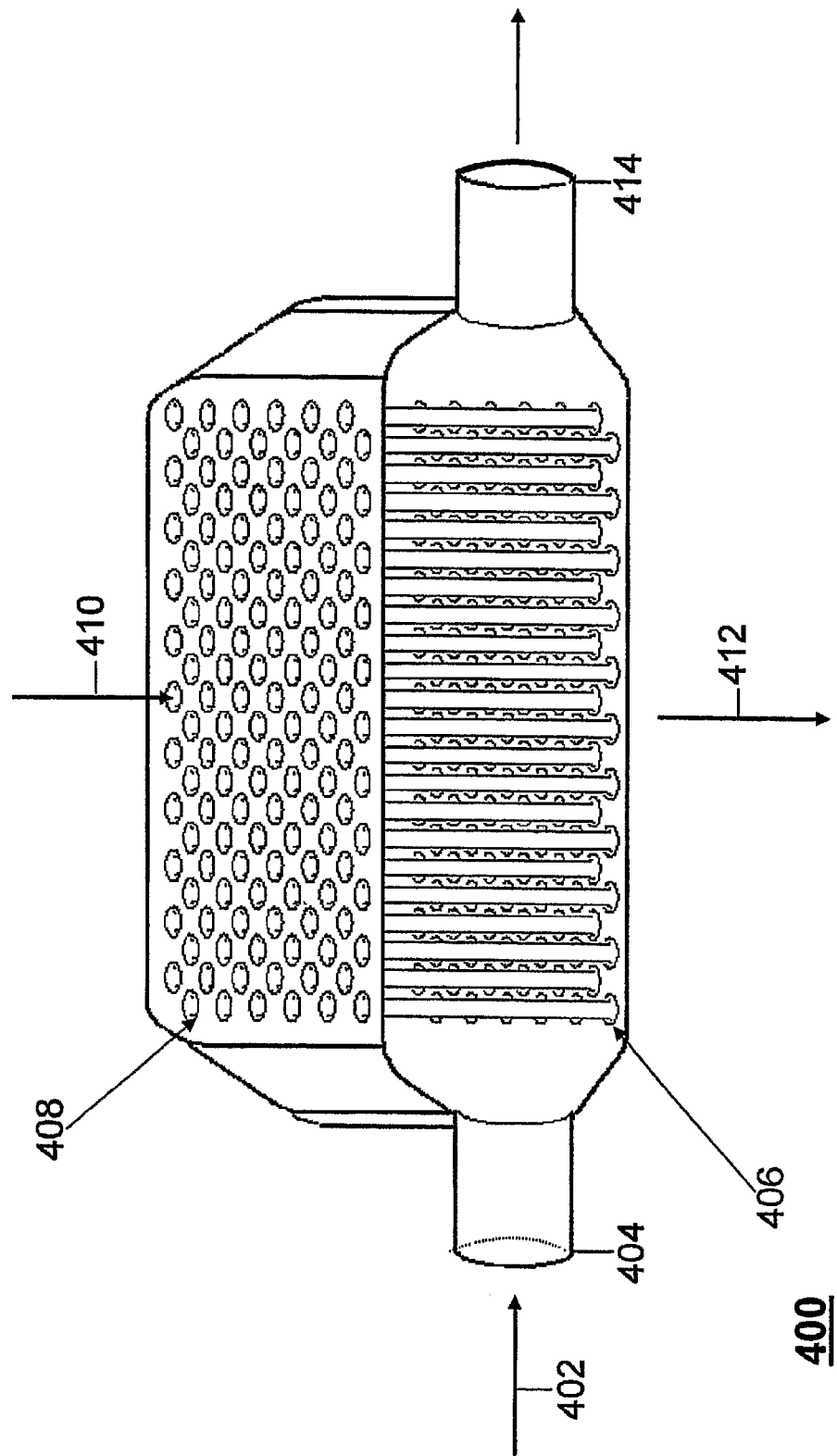
FIG. 6 is an illustration of one embodiment of a catalyst containing reaction zone with heat exchanging capacity according to the invention.

FIG. 6 illustrates one embodiment of the invention systems which includes a temperature modulator. Catalyst containing reaction zone 400 is supplied with reactive component containing vapor 402 via inlet 404. Reaction zone 400 includes catalyst coated tubes 406 positioned vertically in the reaction zone. Preferably, tubes 406 are removable to facilitate catalyst replacement. Reaction zone 400 can include fins or passages 408 to facilitate passage of a heat exchange medium for heating or cooling of the reaction zone. As shown in the Figure, a heat exchange medium (either a gas, such as air, or a liquid, such as water) can enter the reaction zone via top 410 of reaction zone 400, flowing across the fins or passages 408 of the reaction zone, and exit bottom 412. Vapor of a reduced reactive component content exits reaction zone 400 via outlet 414.

Figure 7:
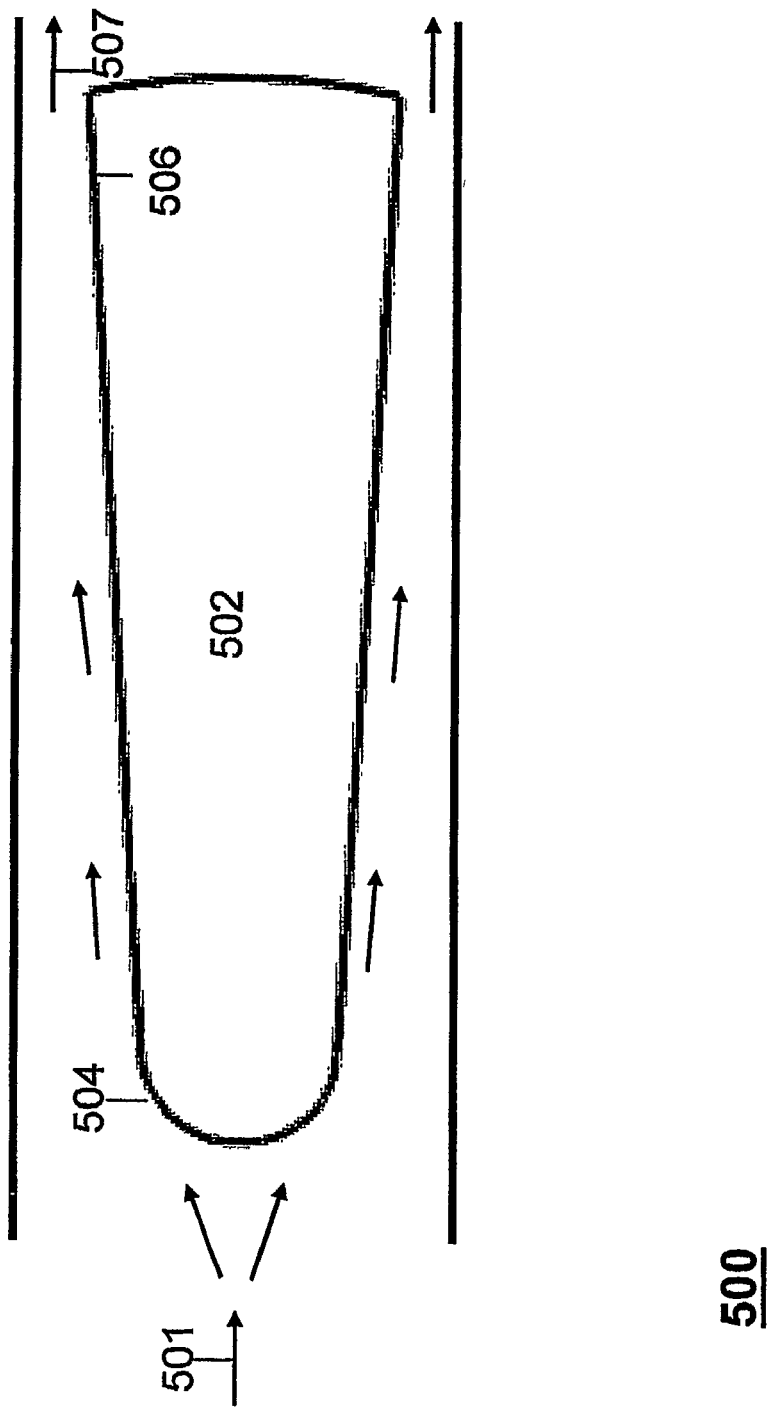
FIG. 7 is an illustration of one embodiment of a catalyst containing tube for the reduction of reactive component(s) according to the present invention.

FIG. 7 illustrates one embodiment of a catalyst tube for the reduction of reactive component(s) according to the present invention. Tube 500 includes a catalyst coated cone 502, positioned such that tip 504 of the cone is upstream from the base of cone 506. Flow of gas stream 501 through the tube is generally shown by the arrows. Such an arrangement, wherein a cone is positioned within the tube, facilitates maximum interaction between the catalyst and the vapor, allows for a greater concentration of catalyst downstream, and allows for control of the flow of the fuel vapor and air mixture from which reactive component is being extracted. Vapor having reduced reactive component content 507 flows past cone 506.

Figure 8:
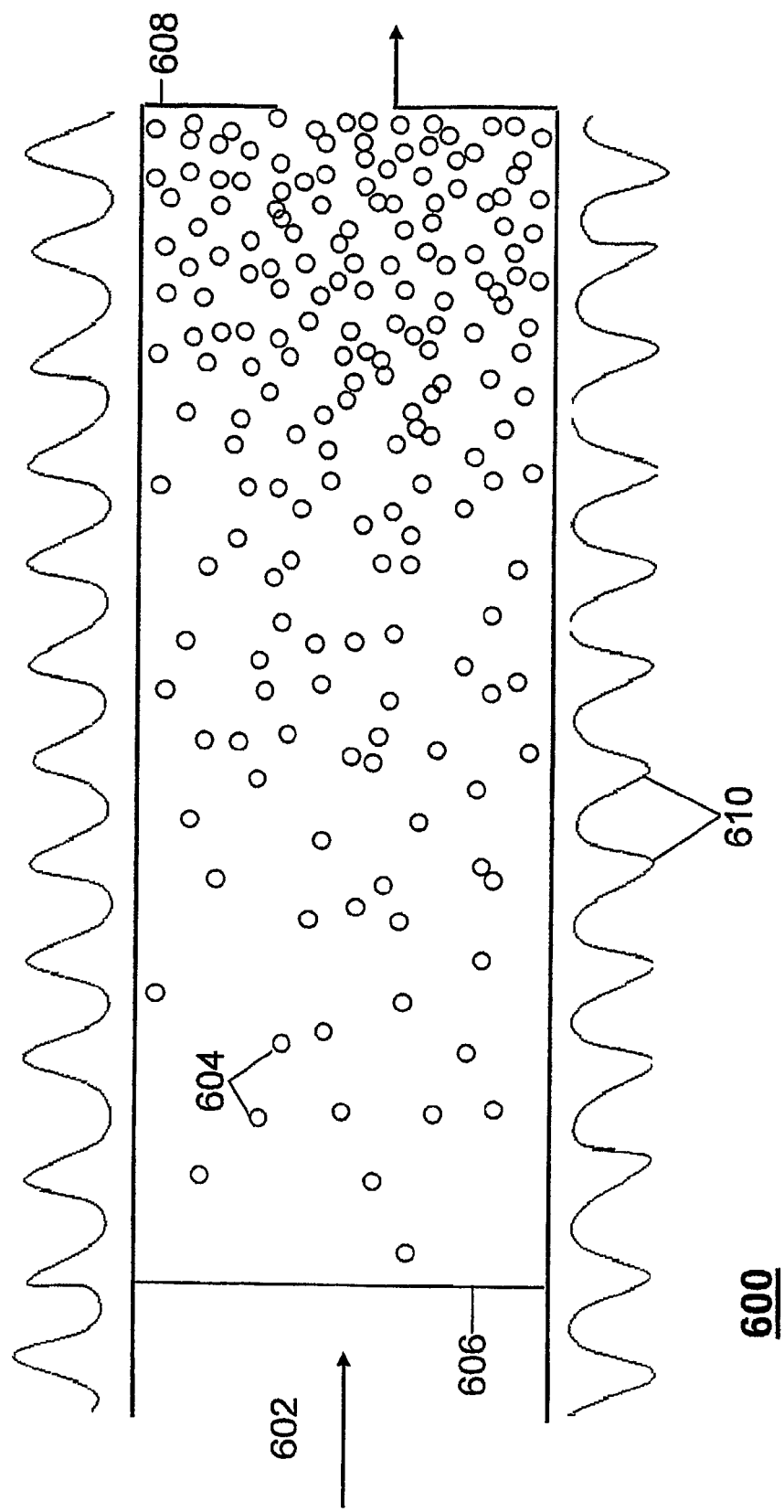
FIG. 8 is an illustration of a catalyst tube having a gradient density according to the present invention.

FIG. 8 illustrates an embodiment of a catalyst tube/heat exchanger for the reduction of reactive component(s) in a fuel vapor. Catalyst tube/heat exchanger system 600 can include tube 602, which can be packed with catalyst particles 604 (shown in the Figure as open circles). Optionally, inert non-catalytic solid particulates (not shown) may also be present in the tube. The tube may include screens positioned at entrance 606 and exit 608 of the catalytic zone for retention of the catalyst and non-catalyst particles. In the embodiment shown in the Figure, catalyst density in the tube can be higher downstream than upstream. Non-catalytic solid particles may be spent catalyst, support materials without catalyst, glass beads, or the like. The gradient catalyst distribution facilitates even distribution of heat loads and results in a gradual reduction of reactive component concentration from the feed vapor. The tube design can incorporate fins or ridges 610 to provide maximum surface area to function as a heat exchanger.

Figure 9A:
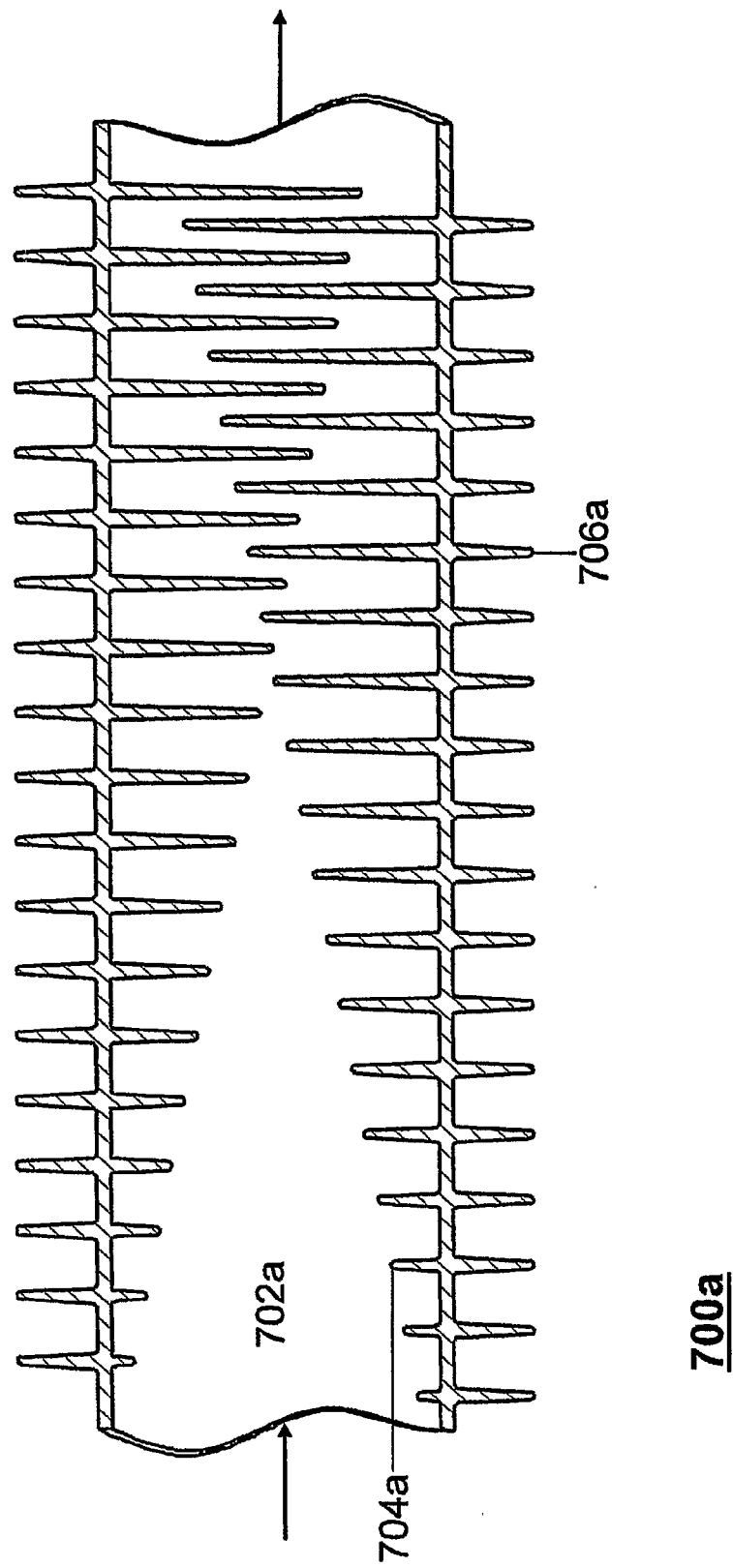
FIGS. 9A and 9B illustrate two embodiments of a catalyst tube having internal fins suitable for coating with catalyst.
Figure 9B:
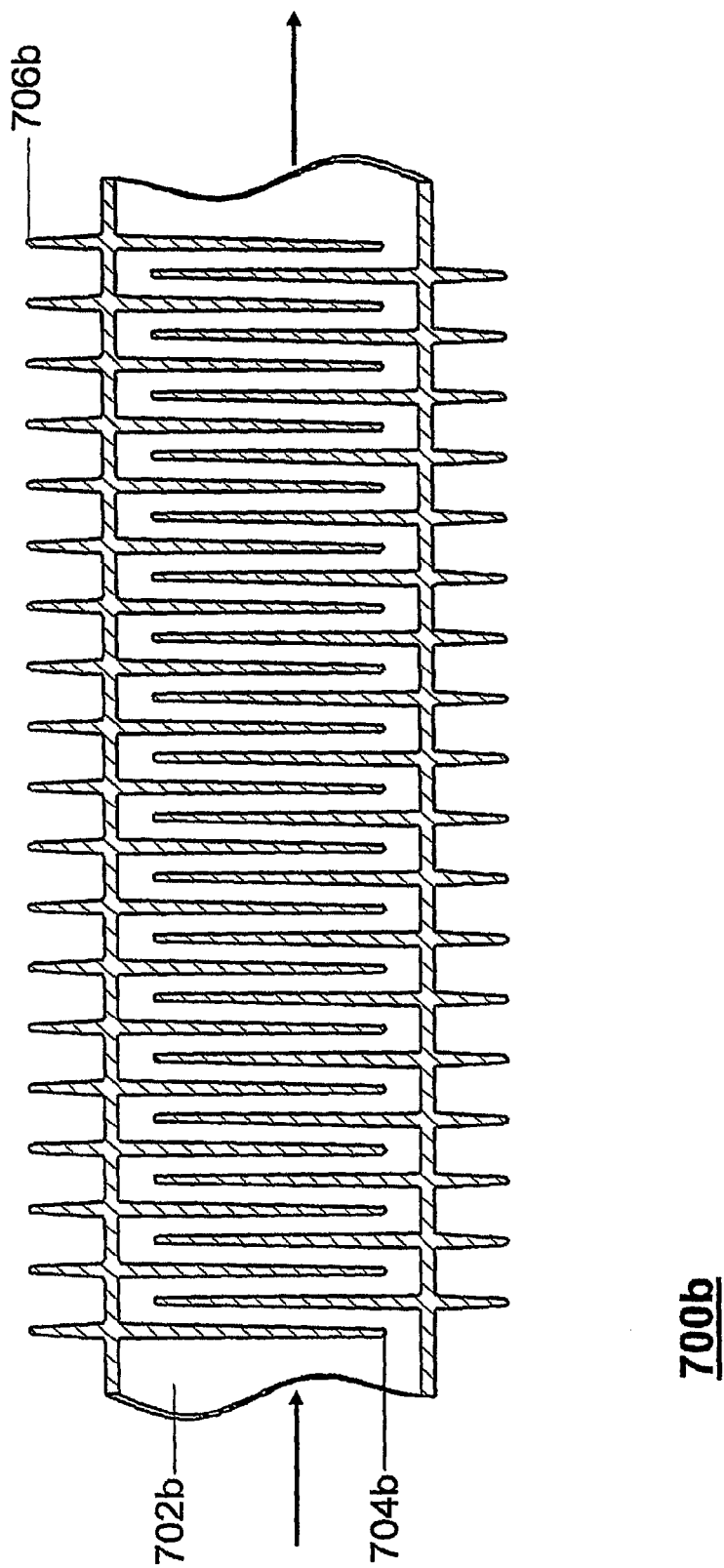

FIG. 9 collectively illustrates two embodiments of a catalyst tube/heat exchange system (shown as 700a and 700b in FIGS. 9A and 9B, respectively) for the removal of reactive component(s) from a fuel vapor, and optionally air, stream. Flow of the fuel vapor mixture is indicated by the arrows wherein the vapor stream to be treated enters the tube at an upstream position and exits at a downstream position. The interior of catalyst tubes 700a and 700b includes catalyst coated fins 704a and 704b. The tubes may be configured to have a gradient catalyst density, as shown in tube 700a, wherein the length of catalyst coated fins 704a increases as the vapor stream progressed downstream in the tube. In another embodiment, the tube may be configured to have a uniform catalyst density, as shown in tube 700b, wherein the length of catalyst coated fins 704b is uniform throughout the length of the catalyst tube. As shown, the tubes can include heat exchange fins, as shown on the exterior of tubes 706a and 706b. The greater the surface area exposed in a heat exchanger system, the greater facilitation of heat transfer. Catalyst coated fins 704a and 704b may vary in width to facilitate maximum contacting of the fuel vapor with the catalyst.

Figure 10A:
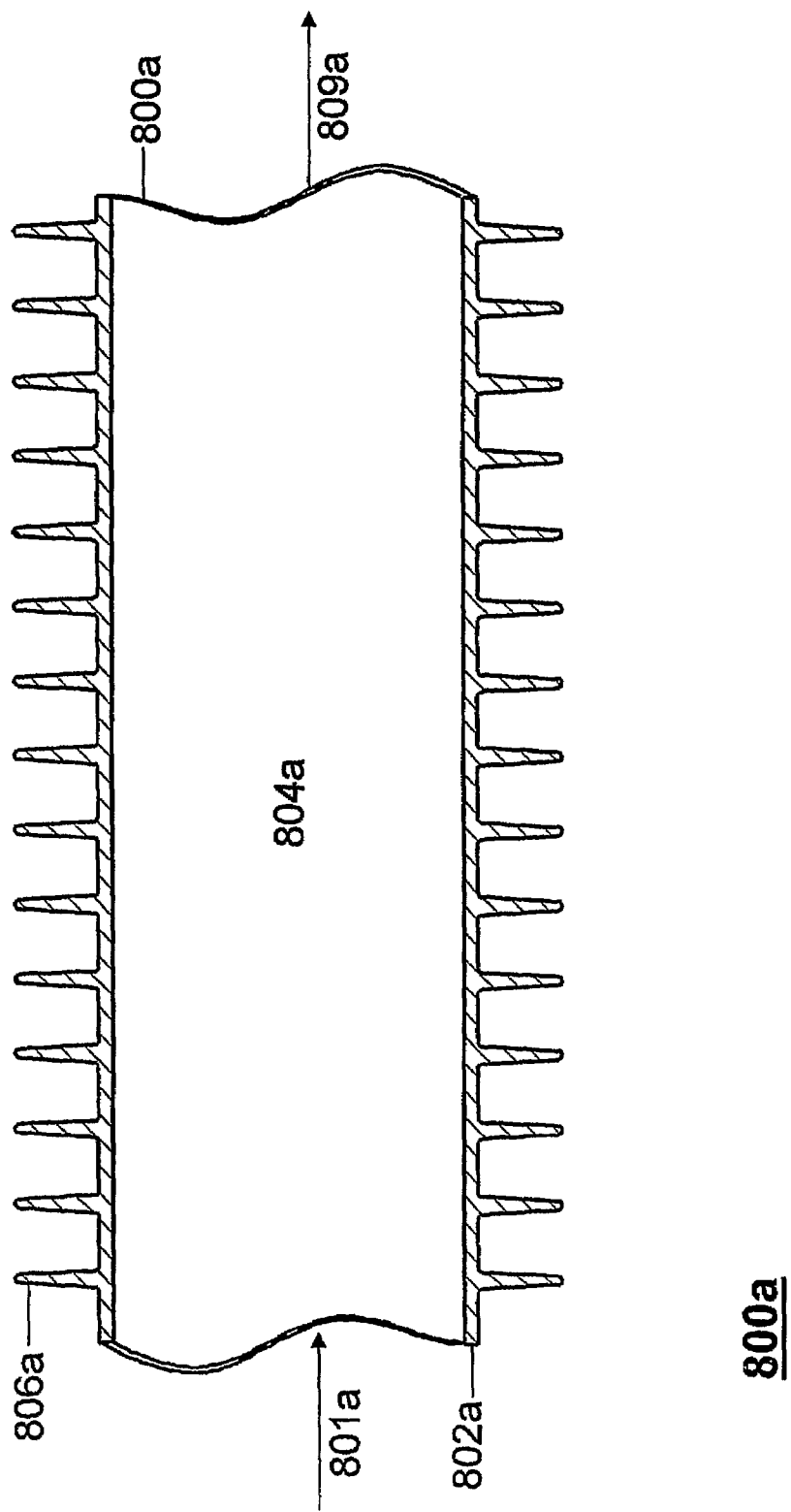
FIG. 10A is a view of an embodiment of a catalyst tube having external fins.

FIG. 10 collectively illustrates three catalyst tube/heat exchanger designs. As shown in FIG. 10A, a catalyst tube is provided for the removal of reactive component(s) from a feed stream of fuel vapor and air. Tube 800a includes wall 802a and interior section 804a. Optionally, interior 804a can include screens (not shown) to retain catalyst particles in a defined space and volume. Tube 800a includes fins 806a on the outside surface of the tube to facilitate heat transfer with the catalyst tube.

As shown in FIG. 10B, a catalyst tube with no heat exchanger fins is provided. The tube includes wall 802b, interior section 804b, wherein the interior section can include catalyst coated cone 808b. Preferably, the catalyst coated cone 808b has tip 810b and base 812b, and preferably the tip of cone 810b is positioned upstream from the base of catalyst cone 812b.

Figure 10C:
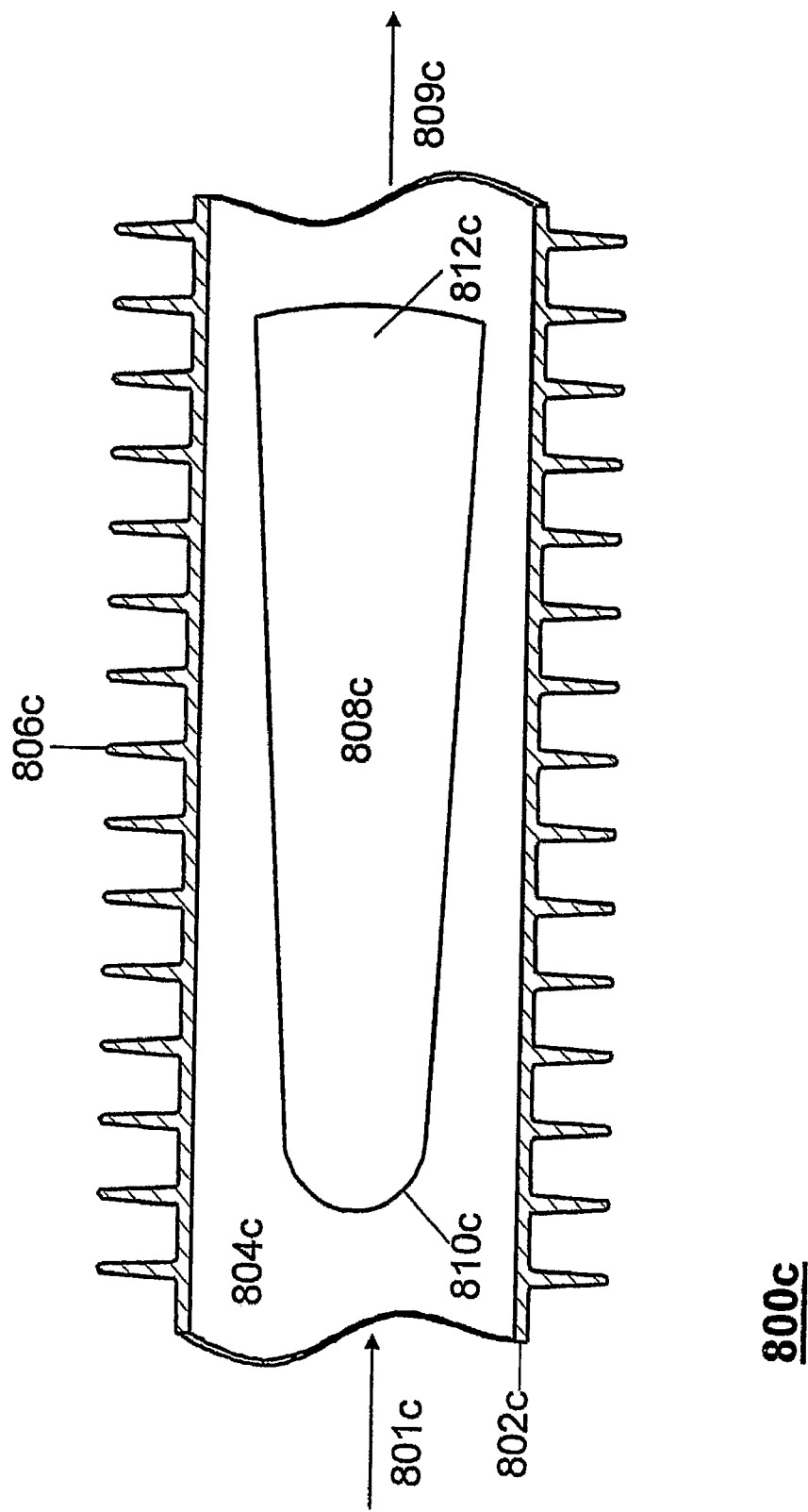
FIG. 10C is a view of an embodiment of a catalyst tube having both external fins and an internal cone which may be coated with catalyst.

As shown in FIG. 10C, a catalyst tube with catalyst coated cone 808c and heat exchange fins 806c is provided. The tube includes wall section 802c and interior section 804c provided within the wall of the tube. Interior 804c includes catalyst coated cone 808c, wherein the cone preferably has tip 810c and base 812c, wherein the tip of the cone 810c is preferably positioned upstream from base 812c of catalyst coated cone 808c. Fins 806c extend from the exterior of the tube wall, and facilitate heat transfer.

Figure 11:
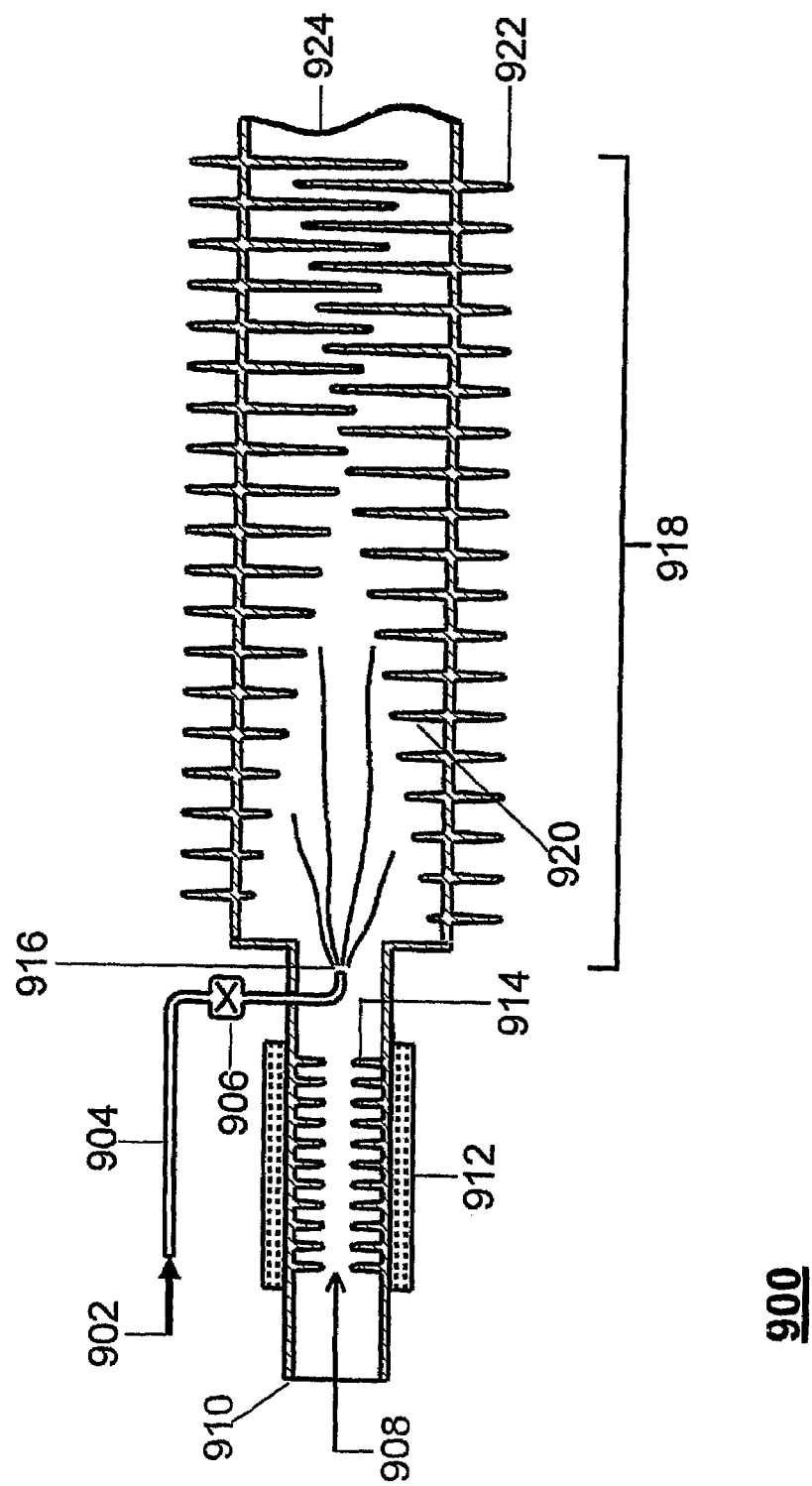
FIG. 11 is a view of an embodiment of a reactive component reduction system according to the present invention.

FIG. 11 shows an embodiment of the invention reactive component removal system. Fuel vapor 902 is supplied to reactive component removal system 900a via line 904 which may optionally include a control valve 906. Fresh or recycled air 908 can be supplied via inlet 910. Air inlet 910 may optionally include heater 912, which may include fins 914 on the interior of the heater, to preheat the air feed stream. Fuel vapor 902 and preheated air 908 combine in reaction zone 918 where the mixture contacts catalyst coated heat exchanger fins 920. Catalyst coated fins 920 are positioned in the interior of catalytic zone 918, while fins 922 are located on the exterior of catalytic zone 918. Catalyst fins 920 can be of various widths and can be positioned within the catalytic zone to facilitate maximum contact between the reactive component containing vapor and the catalyst coated fins. As shown in the Figure, the catalyst zone may be configured to have a gradient catalyst density, or optionally, may have a uniform catalyst density. Fuel vapor/air of reduced reactive component content exits the system via outlet 924.

Figure 12:
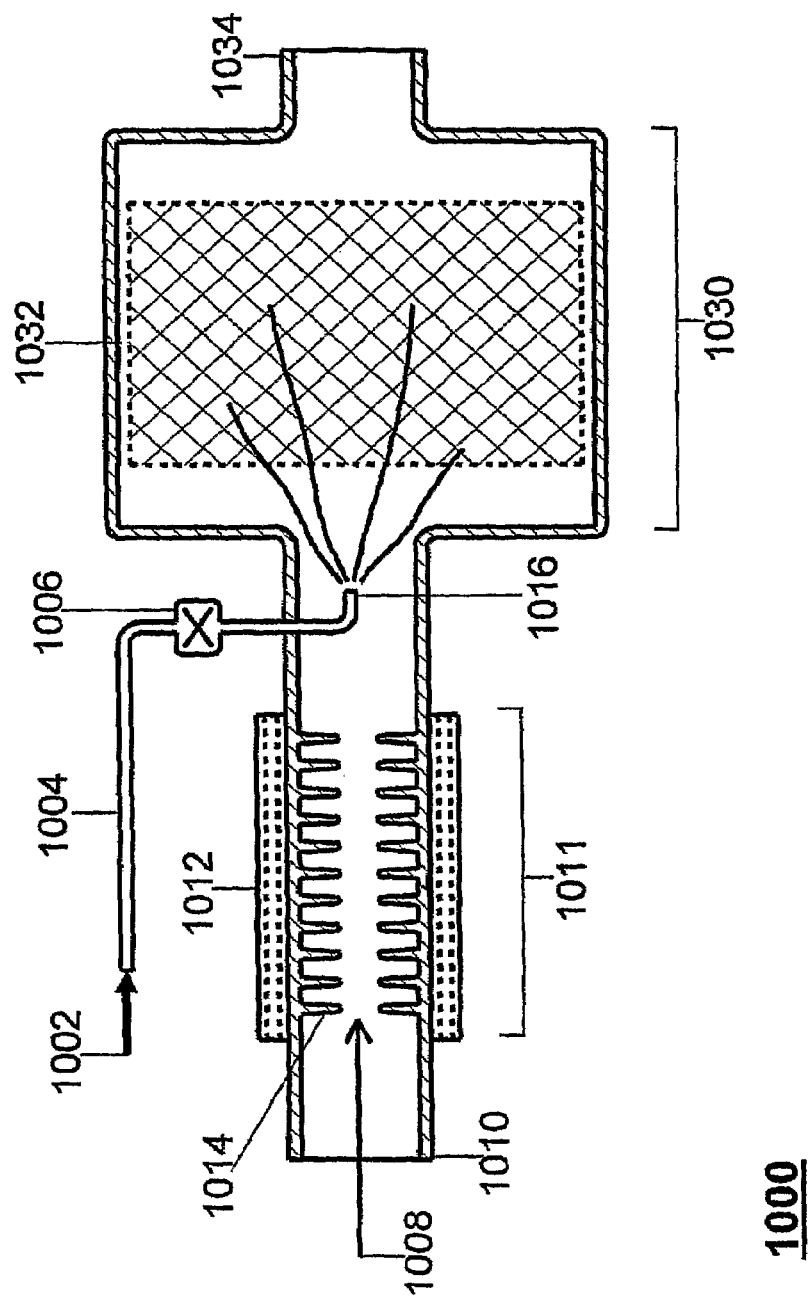
FIG. 12 is a view of another embodiment of a reactive component reduction system according to the present invention.

FIG. 12 shows another embodiment of an invention reactive component removal system. Fuel vapor 1002 is supplied to reactive component removal system 1000 via line 1004 which may optionally include valve 1006. Air 1008, which may be freshly supplied air or recycled air, is supplied to inlet 1010 of reactive component removal system 1000. The air passes through preheat zone 1011, which can include heat exchanger 1012 and fins 1014 or other means of increasing the surface area the air comes in contact with. The preheated air and fuel vapor enter reaction zone 1030 which can include a catalyst source. As shown in the Figure, the catalyst containing source may be a wire mesh or honeycomb structure 1032. The fuel vapor/air mixture of reduced reactive component content exits reactive component removal system 1000 via outlet 1034.

Figure 13:
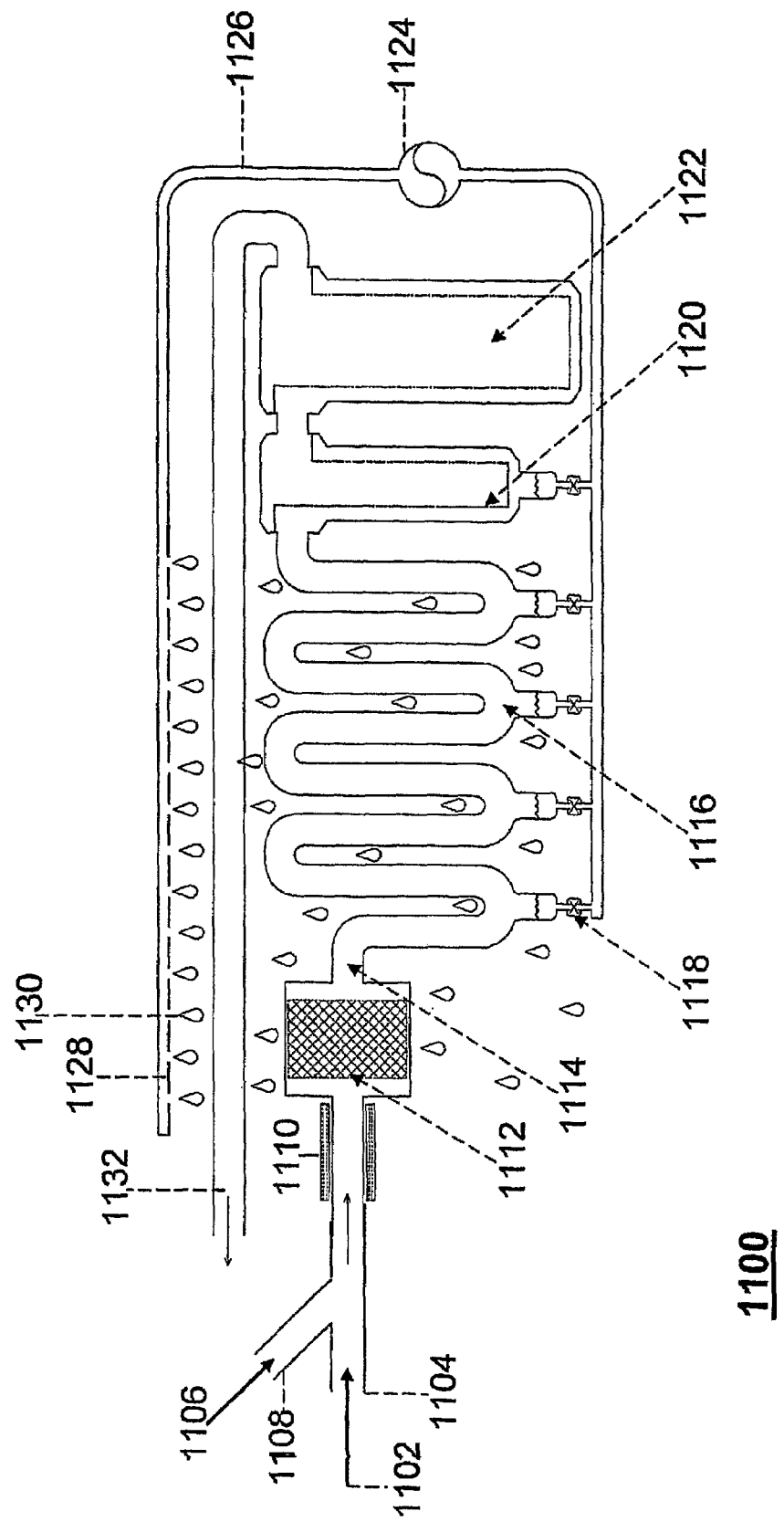
FIG. 13 is a view of an embodiment of a reactive component reduction system featuring evaporative cooling according to the present invention.

FIG. 13 illustrates one embodiment of an inerting system which employs evaporative cooling to facilitate the removal of moisture from a feed stream comprising the vapor phase from a fuel cell (not shown). Fuel vapor 1102 is supplied to inlet 1104 of inerting system 1100 where it optionally combines with second gas source 1106 supplied via line inlet 1108, such as for example, air. The vapor is passed through heater 1110, which can be a heat exchanger, and is then passed into reaction zone 1112, which can include a catalyst system and a heating or cooling system as desired. The vapor exiting the reaction zone via reaction zone outlet 1114 passes through condenser section 1116, which can be contacted on the exterior of the piping with a liquid, such as for example, water. Water removed from the treated vapor in the condenser section can be collected at the bottom of the tubes, and may be removed from condenser section 1116 via any one of a plurality of valves 1118 located at a low point of condenser section 1116. Liquid removed from the treated vapor via drain valves 1118 can be circulated within the evaporative cooling system via pump 1124 and used as needed. Inerting system 1100 can also include moisture filter system 1120 and can optionally include other desired filtering system(s) 1122, such as for example, a system configured for the removal of oxygen, hydrocarbons, or any other undesired component remaining in the treated vapor stream. The evaporative cooling system can recirculate water removed from the vapor via line 1126 to holes 1128, thereby allowing the water to contact condenser section 1116 of the reactive component removal system, thereby further facilitating removal of water from the vapor.

Figure 14:
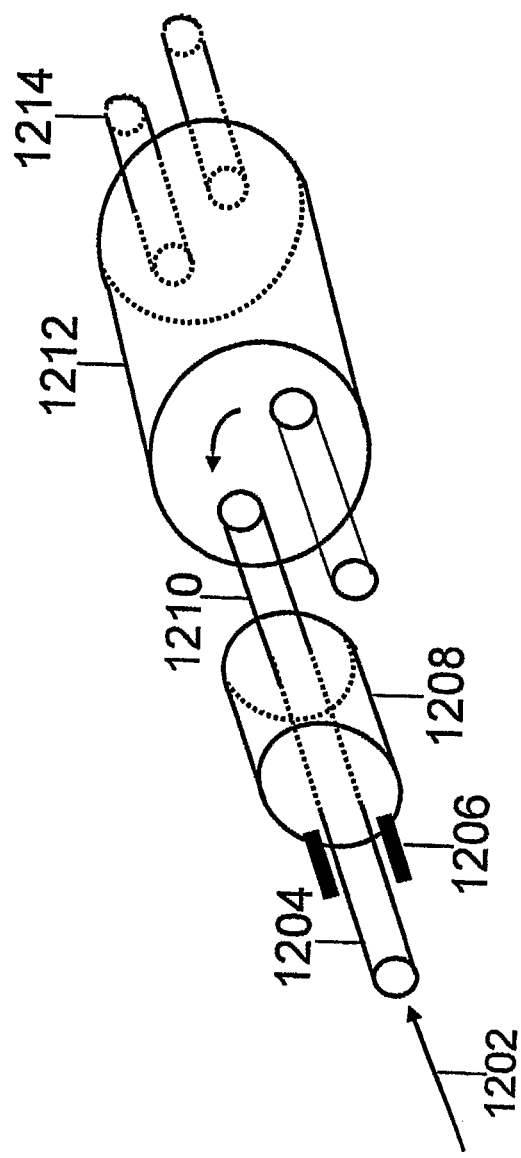
FIG. 14 is a view of an embodiment of a rotary water removal system contemplated for use in the practice of the present invention.

FIG. 14 illustrates one embodiment of a system for the removal of heat and moisture from a vapor stream. Fuel vapor feed stream 1202, and optionally air, is supplied to inlet 1204 of removal system 1200. Inlet 1204 may optionally include pre-heater 1206. The optionally preheated stream is supplied to catalytic zone 1208, which may include a catalyst material positioned to facilitate maximum contact between the vapor and the catalyst. Treated vapor of a reduced reactive component content exits catalytic zone 1208 via outlet line 1210 and enters rotary inline device 1212. The rotary inline device may be used to facilitate either water removal, heat removal or both from the exiting vapor stream. Device 1212 rotates either clockwise or counter-clockwise about the axis defined by outlet 1210. Vapor exits inline device 1212 via line 1214.

Figure 15:
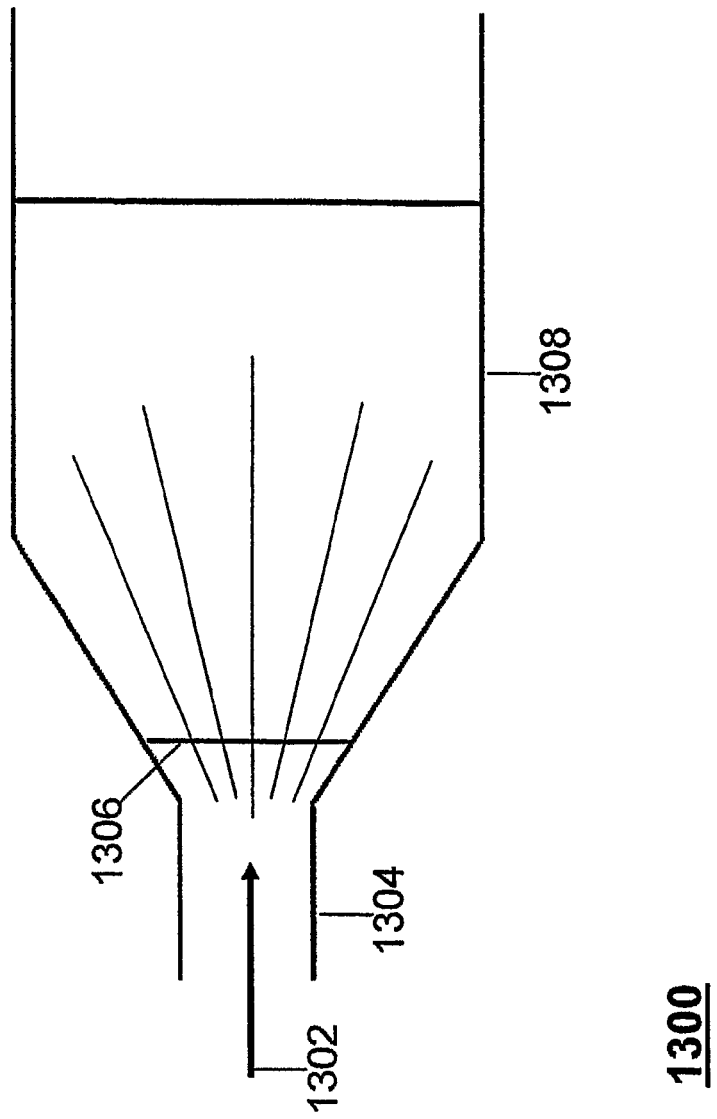
FIG. 15 is a view of an embodiment of a catalyst tube contemplated for use in the practice of the present invention.

FIG. 15 illustrates one method for the control of cooling within an reactive component removal system. Vapor enters the cooling device 1300 via line 1302. Preferably, vapor stream 1302 is cooled by expansion cooling, wherein the diameter of the inlet tubing is smaller than the diameter of the outlet tubing. The greater volume leads lower pressure, and subsequently a lower temperature. The expansive heating unit can include screen 1306 which can further facilitate a reduction in pressure upon exiting device 1300.

While the exemplary embodiments illustrated in the Figures and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims.

That which is claimed:

1. A system for reducing the concentration of one or more reactive component(s) from the vapor phase of a fuel storage tank, wherein said fuel storage tank is provided with an outlet for removal of vapor therefrom and an inlet for return of vapor thereto, said system comprising:
    a reaction zone, wherein said reaction zone provides conditions suitable to deactivate said one or more reactive component(s) when contacted therewith,
    an inlet to said reaction zone in fluid communication with the vapor space of said fuel storage tank via the outlet of the fuel storage tank, and
    an outlet from said reaction zone in fluid communication with the vapor space of said fuel storage tank via the inlet of the fuel storage tank,
    wherein said system is a closed loop system.

2. The system of claim 1 further comprising inlet/outlet for equilibrating pressure within the system upon exposure to sub- or super-atmospheric conditions.

3. The system of claim 2, which said inlet/outlet comprises a source of make-up gas to equilibrate pressure within the system upon exposure to sub-atmospheric conditions.

4. The system of claim 2 wherein said inlet/outlet comprises a vent to equilibrate pressure within the system upon exposure to super-atmospheric conditions.

5. The system of claim 1 wherein said reactive component(s) is oxygen.

6. The system of claim 1 wherein said vapor phase further comprises fuel vapor.

7. The system of claim 1 wherein said reaction zone comprises a vessel containing catalyst, wherein said catalyst is reactive with said one or more reactive component(s) when contacted therewith under suitable conditions.

8. The system of claim 7 wherein the vessel has an inlet end and an outlet end, and the catalyst content varies from the inlet end to the outlet end.

9. The system of claim 8 wherein the catalyst content increases from the inlet end to the outlet end.

10. The system of claim 7 wherein said catalyst is an optionally supported metal catalyst.

11. The system of claim 10 wherein said metal catalyst is selected from the group consisting of noble metals, precious metals, transition metal oxides, rare earth oxides, and mixtures of any two or more thereof.

12. The system of claim 7 wherein said suitable conditions for contacting said catalyst with said one or more reactive component(s) comprise a temperature in the range of about 25° C. up to about 1200° C.

13. The system of claim 7 wherein the reaction zone is associated with a temperature modulator.

14. The system of claim 13 wherein said temperature modulator is a heat exchanger.

15. The system of claim 14 wherein the heat exchanger is integrated with the catalyst containing vessel.

16. The system of claim 14 wherein said heat exchanger comprises a heat exchange medium.

17. The system of claim 14 wherein the heat exchange medium is selected from external air or a liquid.

18. The system of claim 14 wherein said heat exchanger is a heat pump.

19. The system of claim 13 wherein said temperature modulator is an evaporative cooler.

20. The system of claim 1 wherein said reaction zone comprises a source of microwave energy sufficient to deactivate said one or more reactive component(s) when contacted therewith.

21. The system of claim 1 wherein said reaction zone comprises a source of plasma energy sufficient to deactivate said one or more reactive component(s) when contacted therewith.

22. The system of claim 1 further comprising a flame arrestor positioned on the inlet and/or outlet of the fuel storage tank.

23. The system of claim 1 further comprising an oxygen sensor before and/or after the reaction zone.

24. The system of claim 1 further comprising a trap downstream from the reaction zone for the removal of water from the vapor.

25. The system of claim 13 further comprising a trap downstream from the reaction zone for the removal of water from the vapor.

26. A system for introducing reactive component-depleted air into a fuel storage vessel as fuel is withdrawn therefrom, or for displacing fuel in, or vapor in the vapor space of, a fuel storage vessel with reactive component-depleted air, said system comprising:
a reaction zone having an inlet and outlet,
a source of air, wherein the source of air is in fluid communication with the inlet of the reaction zone,
a source of fuel vapor, wherein the source of fuel vapor is in fluid communication with the inlet of said reaction zone, and
optionally a filter/condenser, wherein when the filter/condenser is present, the reaction zone is in fluid communication with the inlet of the filter/condenser, and the outlet of the filter/condenser is in fluid communication with the fuel storage vessel,
wherein said reaction zone operates under conditions suitable to remove or reduce the concentration of reactive component in the source of air when contacted therewith in the presence of fuel vapor, and is in fluid communication with the fuel storage vessel, and
wherein said system is a closed loop system.

27. A system for reducing the concentration of one or more reactive components from the vapor phase of a fuel storage tank, wherein said fuel storage tank comprises an outlet for removal of vapor therefrom and an inlet for return of vapor thereto in a closed loop, said system comprising,
a catalyst zone, said catalyst zone comprising an optionally supported metal catalyst, said catalyst being reactive with one or more reactive component(s) when contacted therewith under suitable conditions,
an inlet to said system in fluid communication with the vapor space of said fuel storage tank via the outlet of the fuel storage tank, and
an outlet from said reaction zone in fluid communication with the vapor space of said fuel storage tank via the inlet of the fuel storage tank.

28. The system of claim 27 further comprising a temperature modulator associated with the catalyst zone.

29. The system of claim 27 further comprising a trap for removing water from the vapor.

30. A fuel storage system for use in aircraft, said system comprising:
a fuel storage tank having an outlet for removal of vapor therefrom, and an inlet for return of vapor thereto, and
a reaction zone having an inlet and outlet, wherein said reaction zone provides conditions suitable to deactivate one or more reactive component(s) in the vapor phase of said fuel storage tank when contacted therewith,
wherein the outlet of said fuel storage tank is in fluid communication with the inlet of the reaction zone, and the inlet of said fuel storage tank is in fluid communication with the outlet of said reaction zone,
wherein said system is a closed loop system.

31. The system of claim 30 wherein said reaction zone further comprises a vessel containing catalyst, wherein said catalyst is capable of promoting deactivation of said one or more reactive component(s) when contacted therewith under suitable conditions.

32. The system of claim 31 further comprising a temperature modulator.

33. The system of claim 32 wherein the temperature modulator is associated with the catalyst containing vessel.

34. A method for reducing the concentration of one or more reactive component(s) from the vapor phase of a fuel storage tank, wherein said fuel storage tank comprises an outlet for removal of vapor therefrom and inlet for return of vapor thereto in a closed loon system, said method comprising:
passing at least a portion of the vapor phase from the fuel storage tank through a reaction zone, wherein said reaction zone provides conditions suitable to deactivate said one or more reactive component(s) when contacted therewith, thereby producing a vapor phase having reduced concentration of reactive component(s) therein, and thereafter
returning the vapor phase having reduced concentration of reactive component(s) therein to said fuel storage tank.

35. The method of claim 34 wherein said reaction zone comprises a catalyst containing vessel.

36. The method of claim 34 further comprising contacting said vapor phase from the fuel storage tank with a temperature modulator upstream of the reaction zone.

37. A method for displacing fuel in, or vapor in the vapor space of, a closed loop system comprising a fuel storage vessel with reactive component-depleted air as fuel is withdrawn from said fuel storage vessel, said method comprising:
combining air with vaporized fuel from the ulage of said fuel storage vessel,
passing the resulting combination through a reaction zone under conditions suitable to produce reactive component-depleted air,
optionally removing any water from the reactive component-depleted air to produce substantially water-free, reactive component-depleted air, and
introducing the resulting substantially water-free, reactive component-depleted air into said fuel storage vessel as fuel is withdrawn therefrom.

\* \* \* \* \*

UNITED STATES PATENT AND TRADEMARK OFFICE
CERTIFICATE OF CORRECTION

PATENT NO. : 7,694,916 B2 Page 1 of 1
APPLICATION NO. : 11/994801
DATED : April 13, 2010
INVENTOR(S) : Santosh Limaye and Donald Koenig It is certified that error appears in the above-identified patent and that said Letters Patent is hereby corrected as shown below:

Claim 37, column 14, at line 52, "drawn from said fuel storage vessel," should read -- drawn from said fuel storage vessel in a closed loop system, --;

Claim 37, please delete lines 53-54; and

Claim 37, line 55, "passing the resulting combination", should read -- passing air and vaporized fuel from the vapor space of said fuel storage vessel --.

Signed and Sealed this

Sixteenth Day of November, 2010

David J. Kappos
*Director of the United States Patent and Trademark Office*